United States Patent [19]

Klaue

[11] 4,232,763
[45] Nov. 11, 1980

[54] FULL-COAT DISK BRAKE

[76] Inventor: Hermann Klaue, Tour d'Ivoire 24 e, 1820 Montreux, Switzerland

[21] Appl. No.: 955,143

[22] Filed: Oct. 26, 1978

[30] Foreign Application Priority Data

Oct. 27, 1977 [DE] Fed. Rep. of Germany ...... 2748195

[51] Int. Cl.³ .......................................... F16D 55/10
[52] U.S. Cl. ................................ 188/18 A; 188/71.5; 188/264 AA
[58] Field of Search ............... 188/18 A, 71.5, 71.6, 188/106 F, 251 M, 264 AA; 192/113 A

[56] References Cited

U.S. PATENT DOCUMENTS

| | | | |
|---|---|---|---|
| 2,044,989 | 6/1936 | La Brie | 188/264 AA |
| 2,657,773 | 11/1953 | Driscoll | 188/71.5 X |
| 3,122,221 | 2/1964 | Von Rucker | 188/206 F |
| 3,371,756 | 3/1968 | Spitz | 188/251 M |
| 3,480,115 | 11/1969 | Lallemant | 188/264 AA X |
| 3,664,467 | 5/1972 | Lucien et al. | 188/264AA |

*Primary Examiner*—Duane A. Reger
*Attorney, Agent, or Firm*—Max Fogiel

[57] ABSTRACT

A fully coated disk brake with a brake housing carrier fastened to the wheel or its hub and revolving therewith. A brake housing is seated on the carrier and opens radially towards the outside. The housing accommodates brake rings, carrying a friction coat, fixedly in the peripheral direction, but axially displaceable, and capable of being pressed together by a tightening device for the purpose of braking. The brake housing carrier has distributed over its periphery carrier arms which extend in the axial direction. These carrier arms mount the brake rings and at their ends have abutments which restrict the axial movement of the brake rings. Between the brake rings are radially outward running air passage channels for the flow of cooling air between the carrier arms into the brake housing. The wheel hub may be constructed to serve as brake housing carrier. The brake housing rings may be axially displaceable on the carrier arms of the brake housing carrier and are secured against rotation by projections forming part of the carrier arms; the brake disks, seated between the brake housing rings, are secured by projections forming part of the brake carrier arms.

11 Claims, 11 Drawing Figures

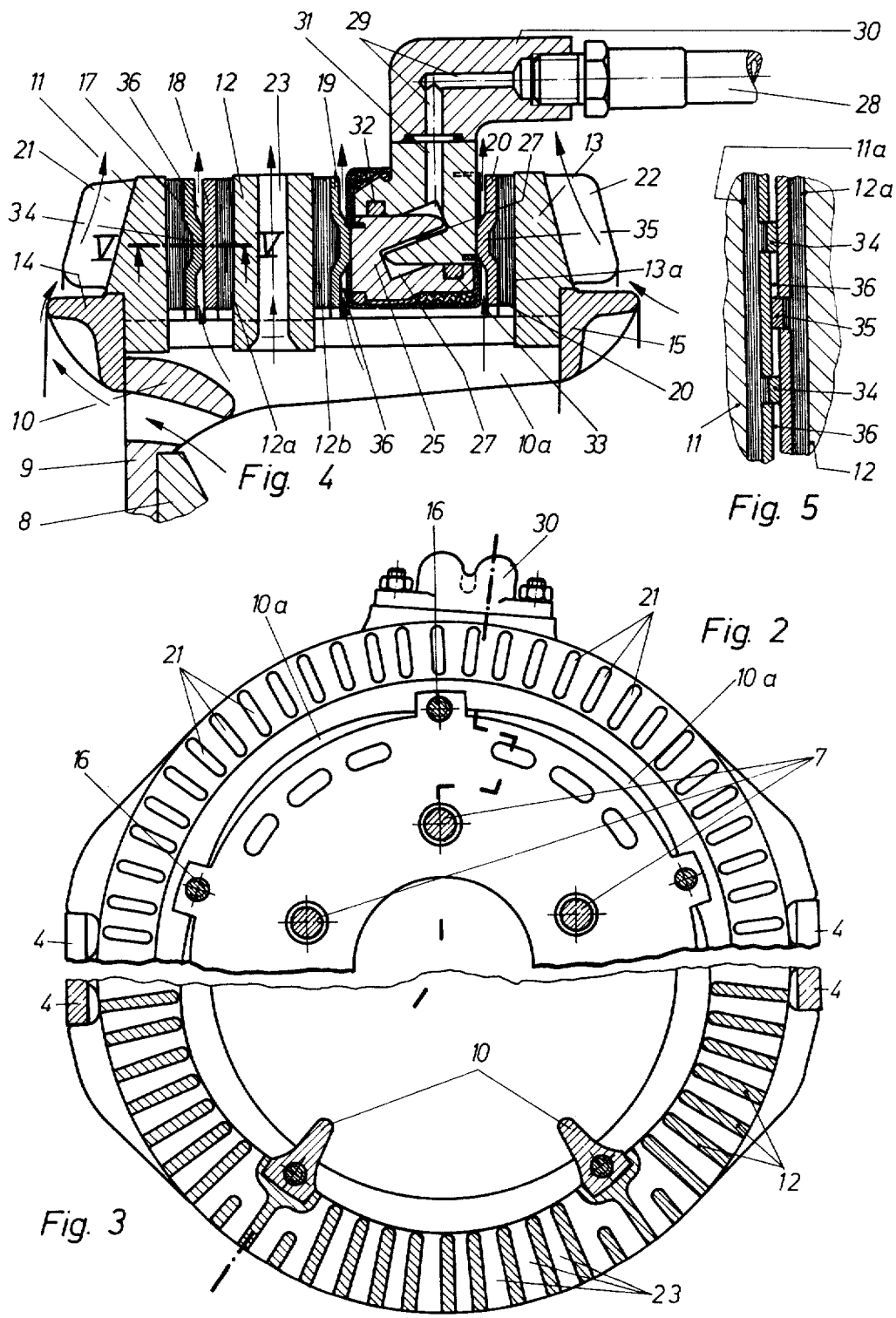

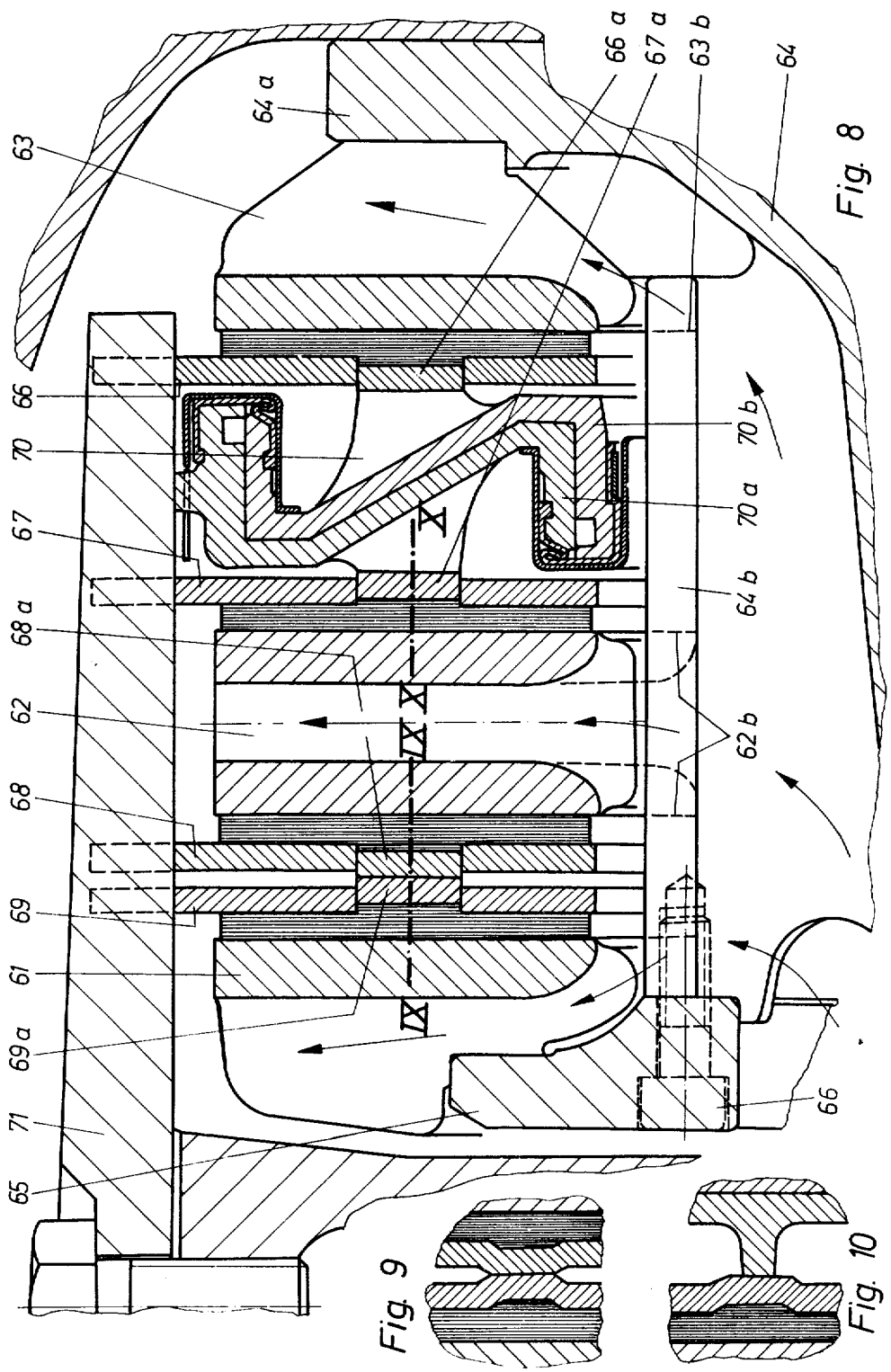

FULL-COAT DISK BRAKE

The invention relates to a full-coat disk brake with a brake housing carrier fastened to the wheel or its hub and revolving therewith, and a brake housing seated on the carrier and open radially towards the outside, in which brake rings, carrying a friction coat, are accommodated fixedly in the peripheral direction, but axially displaceable, and can be pressed together by means of a tightening device for the purpose of braking. It has already been proposed to divide the brake housings into brake housing rings and a brake housing portion formed by the hub. The difficulty with such a solution is supplying the cooling air quantity to the radial cooling fins located on the outside surface of the brake housing rings and to the brake disks from the inside to ensure quick conducting away of the braking heat. To achieve this is the purpose of the invention.

SUMMARY OF THE INVENTION

In accordance with the invention, two or several annular brake rings, equipped with radial fins or ventilation channels opposite the friction surfaces are provided. These brake housing rings are connected on their inside circumference with a brake housing hub, provided with axial projections, in such a manner that at least one of the brake housing rings encloses the axial projections of the brake housing hub on both sides by means of radial extensions reaching towards the inside and that free radial air passages for ventilating the brake develop between the axial projections of the brake housing hub.

By brake engagement by means of radial inwards reaching extensions via the radial projections of the brake housing hub, one achieves the advantage that an expansion of the brake housing ring relative to the brake housing hub, which remains colder, becomes possible without producing impermissibly large stresses which can produce cracks, warping of the brake housing ring portion.

In a further embodiment of the invention, the hub of the vehicle has the form of a brake housing hub. Furthermore, all brake housing rings can have radial extensions reaching to the inside and enclosing the axial projections of the brake housing hub on both sides. In a further embodiment of the invention, the brake housing rings are axially supported on one or both sides by clamping rings which are connected by screws to the brake housing hub, with the axial support of the wheel-side brake housing ring being achieved by contact with the wheel flange of the vehicle hub. Finally, in a further embodiment of the invention, the axleside clamping ring can take the form of a drum for the locking brake (hand brake).

A special advantage is achieved when the brake housing carrier has distributed over its circumference radially extending support arms on which the brake rings are guided and at whose ends are abutments limiting the axial movement of the brake rings; between and/or in the brake rings are radially outward running air passage channels through which the cooling air entering between the support arms into the brake housing can flow to the outside along the brake rings.

The inventive concept permits varied embodiments. Some of these are represented in the drawings.

BRIEF DESCRIPTION OF THE DRAWINGS

FIG. 2 shows a section taken along line II—II in FIG. 1;

FIG. 3 shows a section taken along lines III—III in FIG. 1;

FIG. 4 shows an enlargement of a section of the upper portion of FIG. 1;

FIG. 5 shows a section taken along line V—V in FIG. 4;

FIG. 8 shows a section through another embodiment of a vehicle brake;

FIG. 9 shows a section taken along lines IX—IX of FIG. 8;

FIG. 10 shows a section taken along line X—X of FIG. 8; and

DESCRIPTION OF THE PREFERRED EMBODIMENTS

Figure 1:
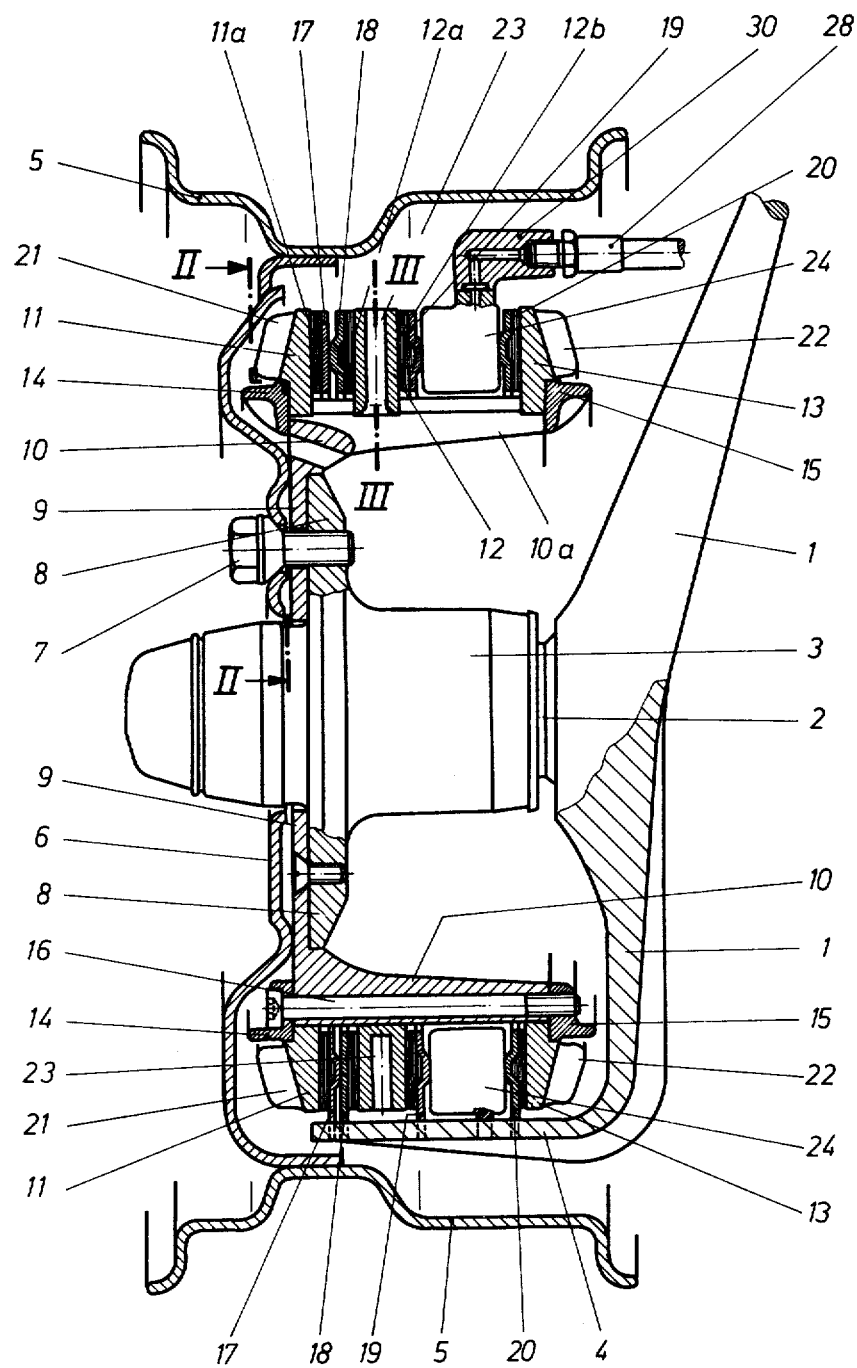
FIG. 1 shows a lengthwise section through the front wheel of a passenger motor vehicle with the associated wheel brake and the wheel suspension.

In the embodiment according to FIG. 1, the wheel carrier 1 is equipped with the axle trunnion 2 on which the wheel with its hub 3 is mounted. The wheel carrier 1 is equipped with brake carrier arms 4 which constitute a part of it.

The actual wheel comprises the wheel rim 5 and the wheel bowl 6 seated therein. It is fixedly connected by wheel bolts 7 to the hub flange 8, with the brake housing carrier 9 being fixedly clamped between the wheel bowl 6 and the hub flange 8. In accordance with the invention, this brake housing carrier is provided with axially running arms 10 distributed over the circumference, with large spaces remaining between these arms to form air passages 10a. These carriers mounting the co-rotating brake housing rings 11, 12 and 13 in such a way that they can expand radially when heated up.

The axial supporting of the brake housing rings is furnished by lateral clamping rings or abutments 14 and 15 which are rigidly connected to each other by bolts 16 as shown in the lower portion of FIG. 1, and in FIGS. 2 and 3. The brake housing rings 11, 12 and 13 rotate with the wheel. Between the brake housing rings 11, 12 and 13, axially displaceable brake disks 17, 18, 19 and 20 are seated. These do not participate in the rotation of the wheel, but are fixed in the peripheral direction, but axially freely moveable in the brake carrier arms 4. The brake disks are all provided with a brake coating. The friction surfaces 11a, 12a, 12b and 13a in friction contact with the brake coatings are covered with a layer of metal and/or metal oxide or metal carbide, for example aluminum and/or aluminum oxide $Al_2O_3$ which are applied by an electrochemical method or by means of plasma or detonation spraying on the brake housing rings formed from light metal or light metal alloys.

Radial cooling fins 21 and 22 are provided on the outside surface of the side facing away from the friction surface of the brake housing rings 11 and 13. These fins conduct the braking heat to the outside air.

The brake housing center ring 12, which is axially freely movable on the arms 10 of the brake housing carrier 9, but is rigidly fixed in the peripheral direction, has on its inside radially outward continuous cooling channels 23.

Between the brake disks 19 and 20 there is the hydraulic clamping unit 24 which is suspended on the brake carrier arms 4; its parts are shown in detail in FIG. 4. This clamping unit comprises the inside ring 25 and the outside ring 26. Both of these together form a Z-shaped pressure space 27 to which braking oil is delivered during braking via the braking hose 28, the drill hole 29 in connecting member 30 and via the drill hole 31 in the outside ring 26. The pressure space 27 is sealed by sealing rings 32 and 33, and a continuous resetting is possible.

So that air may flow through from the brake inside for cooling both between the brake disks 17, 18 and between the clamping unit and the brake disks 19 and 20, the brake disks 17 to 20 have on the side facing the coated surface raised extensions 34 and 35 by which the brake disks contact each other or the clamping unit. This produces radially outward continuous openings or channels 36 through which cooling air can flow from the inside to the outside as indicated by the arrows drawn in FIG. 4.

In order to replace the brake disks in case the brake is worn, after loosening screwbolts 7 and removal of the wheel 5, 6 bolts 16 are removed whereupon clamping ring 14 can be taken off. Then the brake disks and brake housing rings 11 and 12 and brake disks 17, 18 and 19 can be pulled of their carriers. Then the clamping unit 24 can be cooled on brake hose 28 and finally the last brake disk 20 can be taken out. After replacing the brake disks, assembly may take place in the reverse order.

Figure 6:
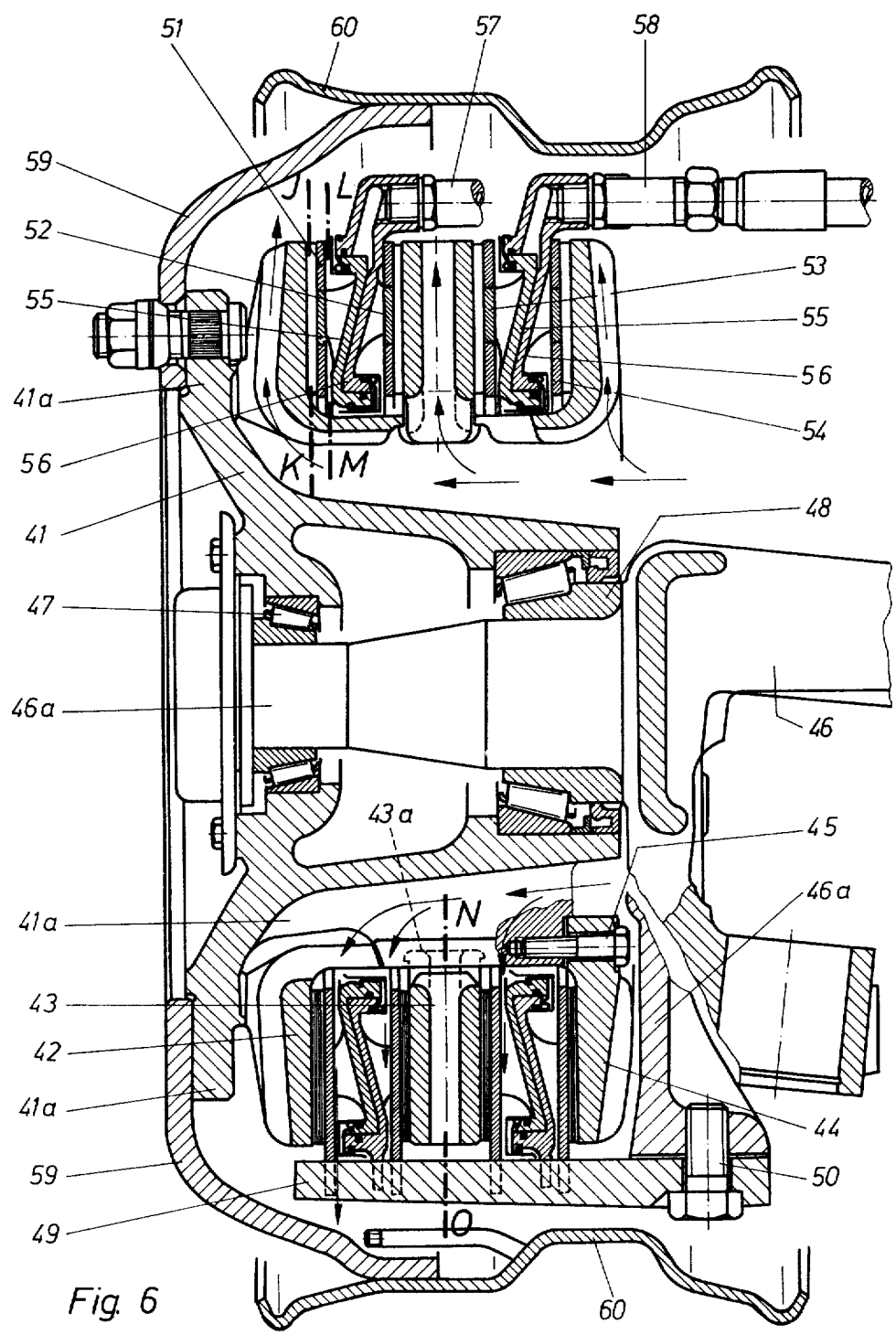
FIG. 6 shows a lengthwise section through front wheel and brake of a heavy utility vehicle.
Figure 7:
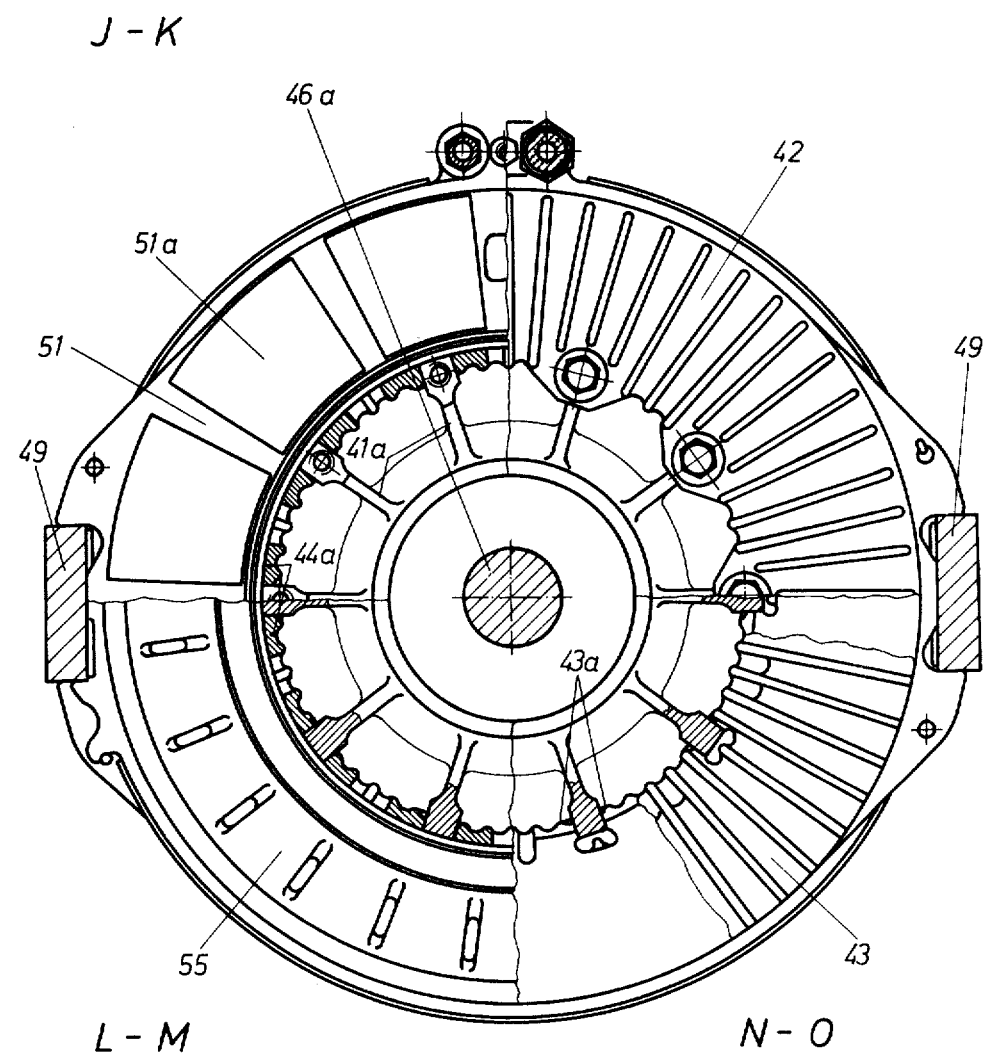
FIG. 7 shows a front view of the brake according to FIG. 1, partially in section.

In the front wheel brake, shown in FIGS. 6 and 7, of a heavy utility vehicle, U-shaped braking chambers, open to the outside, are provided. Here the axle 46 is provided with the axle trunnion 46a on which the wheel hub 41 with the hub flange 41a is mounted in ball bearings 47 and 48. The carrier 46a with the brake carrier arms 49, which enclose the brake, is fixedly seated on the axle. In the lengthwise section of FIG. 5, the three brake housing rings are denoted by 42, 43 and 44. The wheel bowl 59 which is screwed to the hub flange 41 is seated in the wheel rim, as usual. To move the brake housing rings along, the hub 41 has radial ribs 41a to which the final brake ring 44 is screw-connected by means of screws 45. In addition, the brake housing rings include the ribs 41a for torque pickup by means of radial extensions 43a and 44a (FIG. 7). The hub 41 is carried via the bearings 43a and 44a by the trunnion 46a of the axle leg 46. The latter has two extensions 46b to which the brake carrier arms 49 are screwed with screws 50. After removing the brake carrier arms 49, the separated brake disks 51, 52, 53 and 54 can be taken out and replaced without disassembling the spreading devices. The torque pickup of the brake disks proceeds via radial extensions which enclose the brake carrier arms 49.

The spreading devices comprise two rings 55 and 56 of Z-shaped cross-section which are sealed by sealing rings. The air for brake actuation is conducted via lines 57 and 58. The motion of the cooling air during travel is shown by arrows.

FIG. 7 shows on the upper right an outside view of the brake shown in a lengthwise section in FIG. 6. The bottom right shows a section taken along line N-O in FIG. 6, the bottom left a section along line L-M with a view of the spreading device and finally the upper left shows a section along line J-K with a view of the brake disk 51 with the coated segments 51a.

FIGS. 8 to 10 show another embodiment of a front wheel brake for heavy utility vehicles in a partial cross-section. Brake housing rings 61, 62 and 63 made of light metal with wear resistant friction surfaces are used. In this case the brake housing ring 63 is supported axially via its radial outside ribs on the hub flange 64a and the front wheel hub of the vehicle. However, the brake housing center ring 62, similar to the previously described embodiments of the passenger vehicle brake, is axially freely movable, but arranged in the peripheral direction on the projections 64b of hub 64. The brake housing ring 61 is held by the clamping ring 65 which is fastened to the hub by screws 66. This ensures a free radial expansion of this brake housing ring also. The torque of the brake housing rings 61, 62 and 63 is transferred via their radial extensions 61b, 62b and 63b to the projections 64b of the hub. A free expansion of the housing rings is made possible.

The brake disks 66, 67, 68 and 69 are provided with brake coating. The two brake disks 66 and 67 are actuated directly by a pneumatic clamping unit 70 which comprises an outside ring 70a and an inside ring 70b. The two brake disks 68 and 69, by shifting the brake housing ring 62, come into frictional contact with the friction surfaces of the brake housing rings 61 and 62. The brake disks are axially freely movable on the detachable brake carrier arms 71 enclosing the brake housing, but are fixedly suspended in the peripheral direction. The arrows show the air flow by which the heat is conducted away from the rotating parts of the brake.

FIGS. 9 and 10 show the partial cylinder sections denoted by IX—IX and X—X in FIG. 8 by the mutual contact of the brake disks and with the clamping unit 70. So that a free cross-section for the flow of cooling air remains between clamping unit and brake disks, the brake disks have drawn-pressed extensions 66a, 67a, 68a and 69a.

Figure 11:
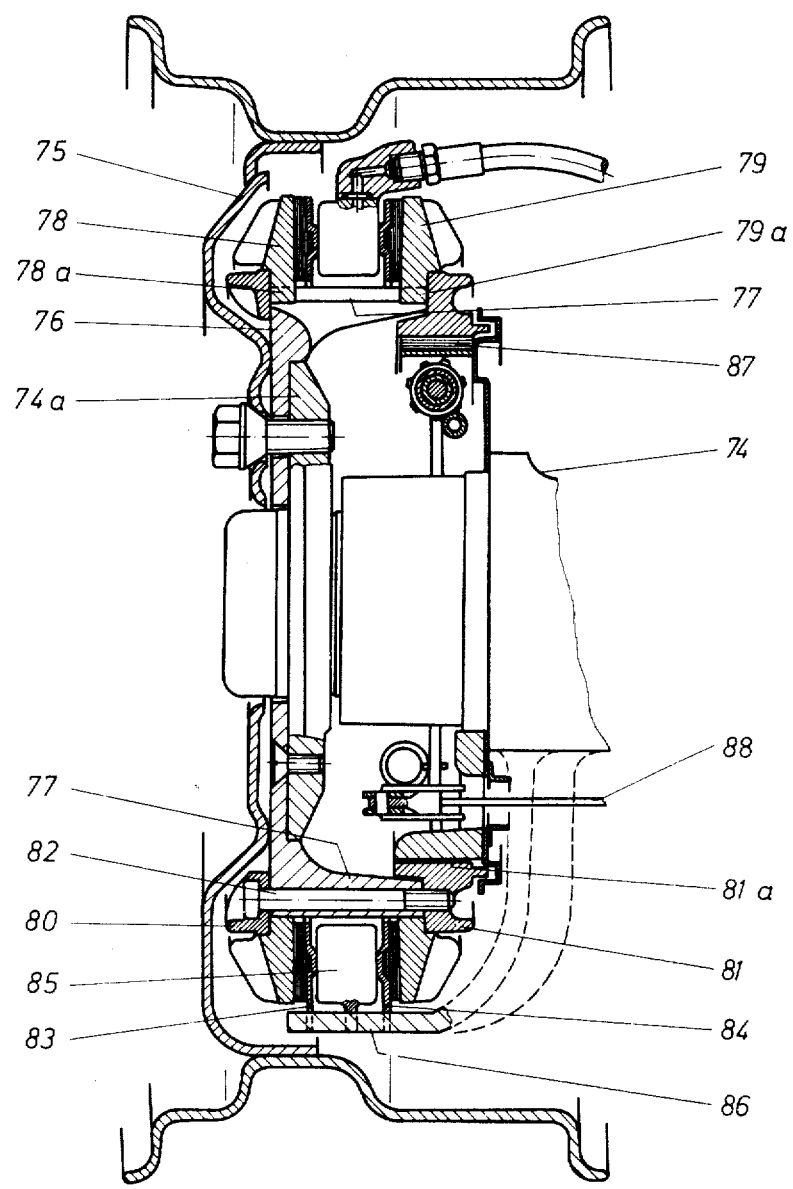
FIG. 11 shows a lengthwise section through a rear wheel with suspension and brake.

Finally, FIG. 11 shows the rear wheel brake of a passenger motor vehicle where an additional drum brake is provided as locking brake. Here, 74 denotes the rear axle which carries the driven hub 74a. Between hub 74a and wheel 75 is the brake housing hub 76 made of light metal which on its axial projections 77 carries the two light metal brake housing rings 78 and 79 via their radial extensions 78a and 79a. The two clamping rings 80 and 81 holding the brake housing are held by screws 82 which penetrate the brake housing hub arms 72. The full-coat disk brake further comprises the two brake disks 83 and 84 between which the hydraulic clamping unit 85 is seated. The stationary parts of the brake are held by the brake carrier arm 86 which encloses the brake housing and is connected to the axle 73. The axle-side clamping ring 81 on its inner periphery has a cylindrical surface 81a which during stoppage of the vehicle is connected with the jaws 87 of a locking brake. The locking (manual) brake is actuated via a traction cable 88.

It is of special significance that the cooling effect can be increased considerably by making the brake parts, particularly the brake rings, of light metal or a light metal alloy and coating their friction surface with a wearing layer which is formed by an electrochemical method or made of a metal and/or metal oxide or metal carbide, particularly aluminum and aluminum oxide, applied via plasma or detonation spraying, and by providing cooling fins or cooling channels on the side facing away from the friction surface. The specific friction coat area should be at least 0.4 cm² per kilogram of wheel load.

I claim:

1. A fully coated disk brake comprising: a disk-shaped brake housing carrier fastened to rotatable means and revolving therewith; a brake housing seated on said brake housing carrier and open radially towards the outside; braking means with a friction coat and fixed in a peripheral direction, said braking means being axially displaceable; tightening means for pressing together said braking means during a braking action; carrier arms distributed over the periphery of said brake housing carrier and extending in an axial direction; said carrier arms mounting said braking means and having abutments restricting axial movement of said braking means; and radially outward running air passage channels between said braking means for admitting cooling air between said carrier arms into said brake housing and onto said braking means; said braking means being fully free within said rotatable means; said carrier arms being spaced at predetermined intervals from each other for admitting an adequate supply of cooling air, said rotatable means having sufficient interior space for aerating and cooling.

2. A fully coated disk brake as defined in claim 1 including a wheel hub constructed as a brake housing carrier.

3. A fully coated disk brake as defined in claim 1 including brake carrier arms, brake housing rings and brake disks, said brake housing rings being axially displaceable on said carrier arms of said brake housing carrier and secured against rotation by projections forming part of said carrier arms, said brake disks being seated between said brake housing rings and secured by projections forming part of said brake carrier arms.

4. A fully coated disk brake comprising: a brake housing carrier fastened to rotatable means and revolving therewith; a brake housing seated on said brake housing carrier and open radially towards the outside; braking means with a friction coat and fixed in a peripheral direction, said braking means being axially displaceable; tightening means for pressing together said braking means during a braking action; carrier arms distributed over the periphery of said brake housing carrier and extending in an axial direction; said carrier arms mounting said braking means and having abutments restricting axial movement of said braking means; and radially outward running air passage channels between said braking means for admitting cooling air between said carrier arms into said brake housing along said braking means; clamping rings providing axial support of said brake housing rings and connected by screws to a hub of the brake housing.

5. A fully coated disk brake as defined in claim 3 wherein one of said brake housing rings is axially supported on the wheel side by contact with the wheel flange of said wheel hub.

6. A fully coated disk brake as defined in claim 4 wherein one of said clamping rings on the axle side is constructed as a drum for a handbrake.

7. A fully coated disk brake as defined in claim 1 wherein said braking means are made of light metal, and friction surfaces coated with a wearing layer formed by a method selected from electrochemical, metal, metal oxide, metal carbide, particularly aluminum and aluminum oxide plasma and detonation spraying, and cooling fins and channels on a side facing away from said friction surfaces.

8. A fully coated disk brake as defined in claim 1 wherein the specific friction coat area is at least 0.4 cm² per kilogram of wheel load.

9. A fully-coated disk brake as defined in claim 1, wherein said braking means comprise brake rings, said rotable means comprising a wheel with a wheel hub and a wheel bowl, said disk-shaped brake housing carrier forming a fixed span between said wheel hub and interior of said wheel bowl, or brake carrier arms, and brake disks, said brake rings being axially displaceable on said carrier arms of said brake housing carrier and secured against rotation by projections forming part of said carrier arms, said brake disks being seated between said brake rings and secured by projections forming part of said brake carrier arms.

10. A fully-coated disk brake as defined in claim 1, including a wheel hub constructed as a brake housing carrier, brake carrier arms, brake housing rings and brake disks, said brake housing rings being axially displaceable on said carrier arms of said brake housing carrier and secured against rotation by projections forming part of said carrier arms, said brake disks being seated between said brake housing rings and secured by projections forming part of said brake carrier arms, one of said brake housing rings being axially supported on the wheel side by contact with the wheel flange of said wheel hub.

11. A fully-coated disk brake as defined in claim 1, including a wheel hub constructed as a brake housing carrier, brake carrier arms, brake housing rings and brake disks, said brake housing rings being axially displaceable on said carrier arms of said brake housing carrier and secured against rotation by projections forming part of said carrier arms, said brake disks being seated between said brake housing rings and secured by projections forming part of said brake carrier arms, clamping rings providing axial support of said brake housing rings and connected by screws to a hub of the brake housing; one of said brake housing rings being axially supported on the wheel side by contact with the wheel flange of said wheel hub, one of said clamping rings on the axle side being constructed as a drum for a handbrake, said braking means being made of light metal, and friction surfaces coated with a wearing layer formed by a method selected from electrochemical, metal, metal oxide, metal carbide, particularly aluminum and aluminum oxide plasma and detonation spraying, and cooling fins and channels on a side facing away from said friction surfaces.

* * * * *